United States Patent
Ganapathi et al.

(10) Patent No.: US 6,694,822 B1
(45) Date of Patent: Feb. 24, 2004

(54) USE OF MULTI-LAYER THIN FILMS AS STRESS SENSOR

(75) Inventors: Srinivasan K. Ganapathi, Fremont, CA (US); Shiva Prakash, Santa Barbara, CA (US)

(73) Assignee: Fidelica Microsystems, Inc., Milpitas, CA (US)

( * ) Notice: Subject to any disclaimer, the term of this patent is extended or adjusted under 35 U.S.C. 154(b) by 0 days.

(21) Appl. No.: 09/502,406

(22) Filed: Feb. 10, 2000

Related U.S. Application Data

(60) Provisional application No. 60/144,843, filed on Jul. 20, 1999.

(51) Int. Cl.$^7$ .................................................. G01L 1/00
(52) U.S. Cl. .......................................... 73/763; 73/728
(58) Field of Search .................. 73/728, 763; 324/252; 204/192.11; 360/325, 324; 338/32 R

(56) References Cited

U.S. PATENT DOCUMENTS

| | | | |
|---|---|---|---|
| 3,612,924 A | | 10/1971 | Semmelink .................. 310/26 |
| 3,774,134 A | | 11/1973 | Kardashian et al. .......... 336/20 |
| 3,807,223 A | | 4/1974 | Juillerat et al. .......... 73/88.5 R |
| 4,242,710 A | | 12/1980 | Hempstead et al. ........ 360/113 |
| 4,509,007 A | | 4/1985 | Barsotti et al. ........... 324/60 C |
| 4,884,453 A | | 12/1989 | Hoffmann et al. ............ 73/776 |
| 5,168,760 A | | 12/1992 | Wun-Fogle et al. .......... 73/779 |
| 5,206,590 A | | 4/1993 | Dieny et al. ................ 324/252 |
| 5,408,377 A | * | 4/1995 | Gurney et al. .............. 360/113 |
| 5,442,508 A | * | 8/1995 | Smith ......................... 360/113 |
| 5,491,600 A | * | 2/1996 | Chen et al. .................. 360/113 |
| 5,648,885 A | | 7/1997 | Nishioka et al. ............ 360/113 |
| 5,856,617 A | * | 1/1999 | Gurney et al. ................. 73/105 |
| 5,891,586 A | * | 4/1999 | Hasegawa et al. .......... 428/668 |

FOREIGN PATENT DOCUMENTS

| | | |
|---|---|---|
| EP | 0 650 139 A1 | 4/1995 |
| EP | 0 690 296 A2 | 1/1996 |
| EP | 0 709 829 A2 | 5/1996 |
| WO | WO 98/52135 | 11/1998 |

\* cited by examiner

*Primary Examiner*—Edward Lefkowitz
*Assistant Examiner*—Andre Allen
(74) *Attorney, Agent, or Firm*—Pillsbury Winthrop LLP

(57) ABSTRACT

The present invention provides a pressure sensing device that includes at least one GMR sensor, and preferably an array of GMR sensors, with each GMR sensor having a conducting spacer layer interposed between two ferromagnetic layers. In an unbiased state, the magnetization vector of each of the ferromagnetic layers is preferably parallel to each other. Upon application of a current, however, the magnetization vector of each ferromagnetic layer is changed, preferably to an antiparallel position, in which state the sensor is used to then sense stress applied thereto. Upon application of stress, the magnetization vectors of both free magnetic layers will rotate, thus causing a corresponding and proportionally related change in the resistance of the sensor. This change in resistance can be sensed and used to calculate the stress applied thereto.

19 Claims, 20 Drawing Sheets

Current Flow

Current Flow

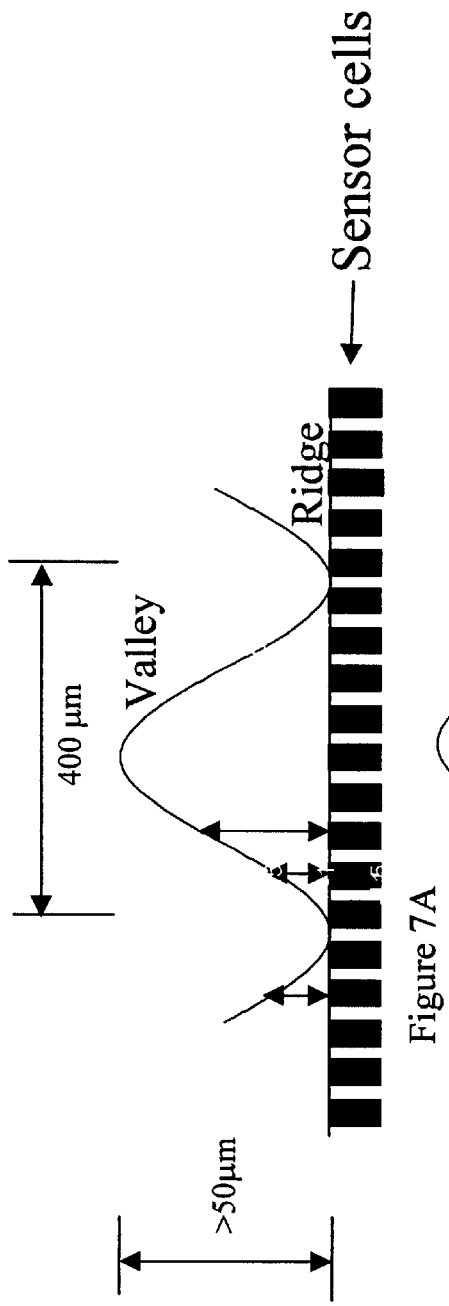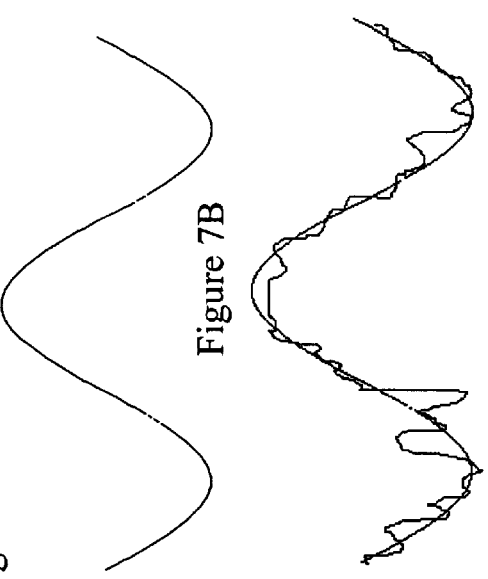

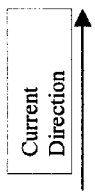 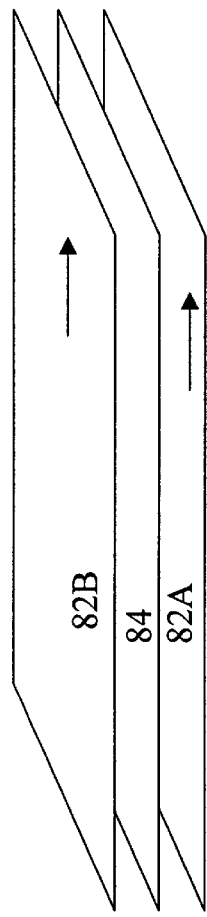
Figure 8A(1)
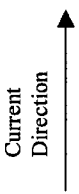 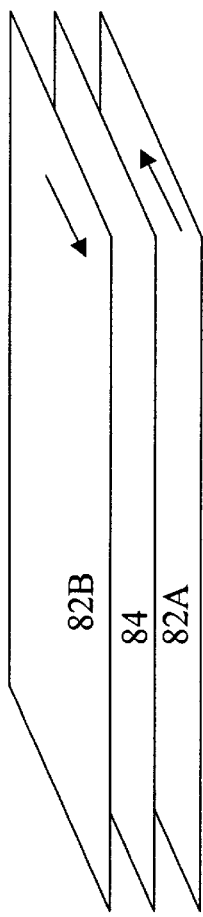
Figure 8A(2)
 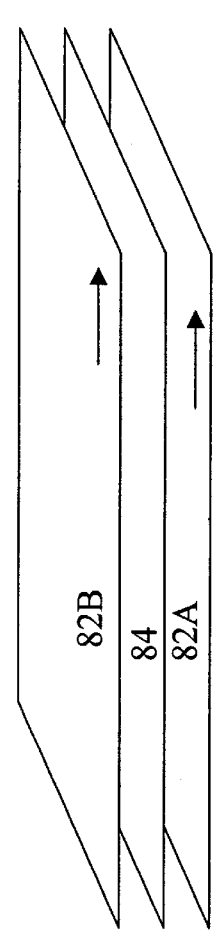
Figure 8A(3)

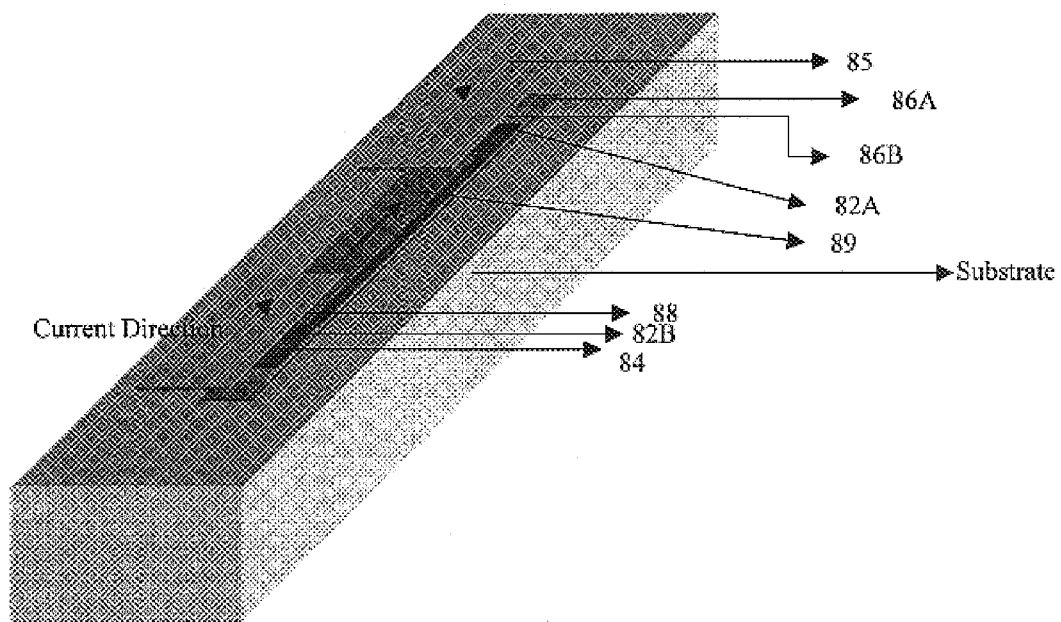
FIG 8D(1)

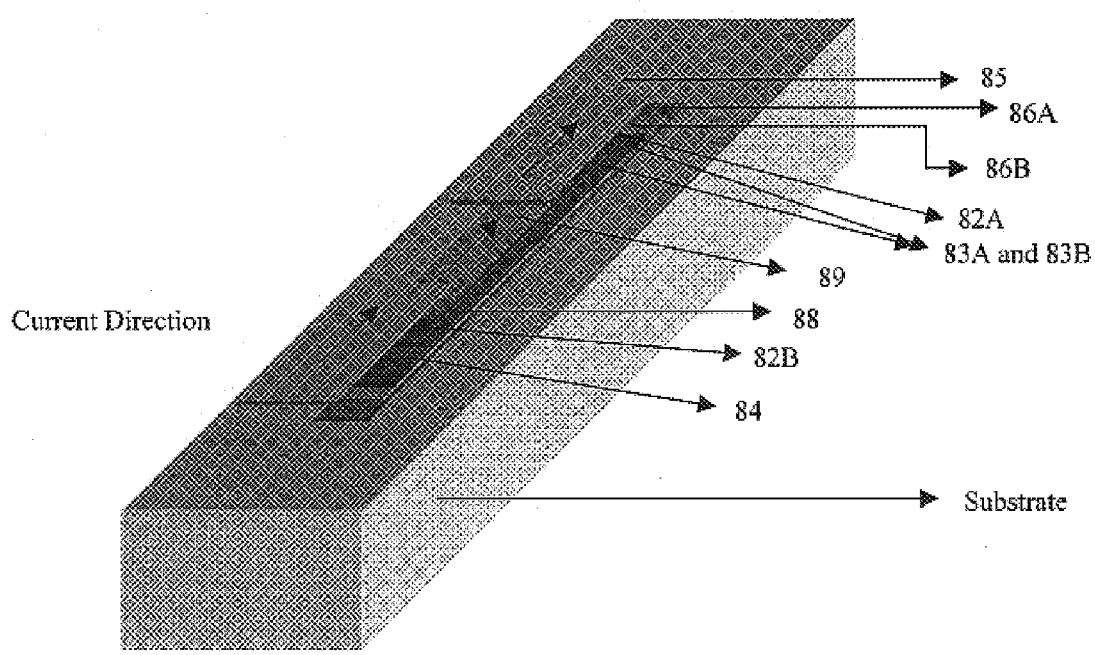
FIG. 8D(2)

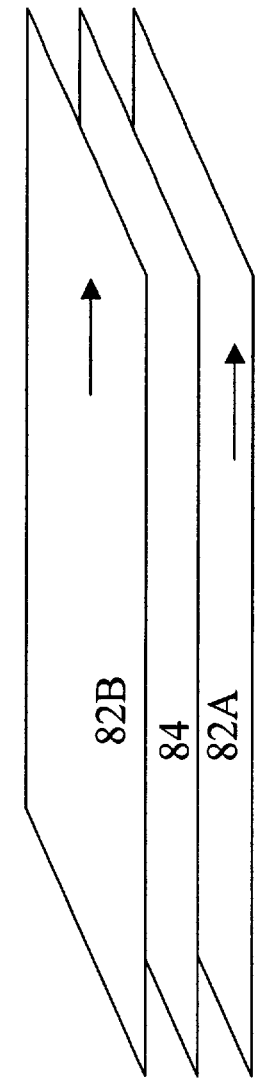
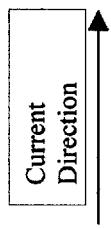
Figure 8E(1)
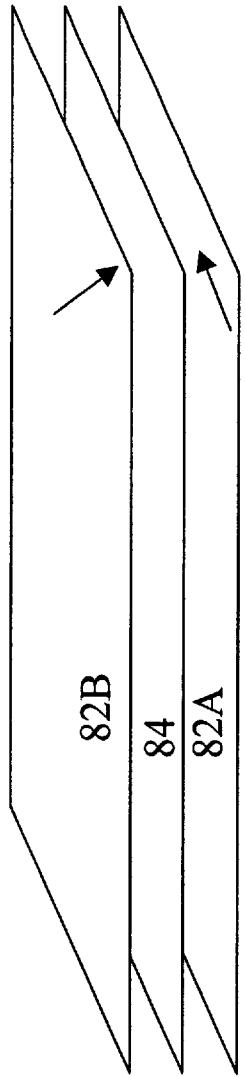
Figure 8E(2)

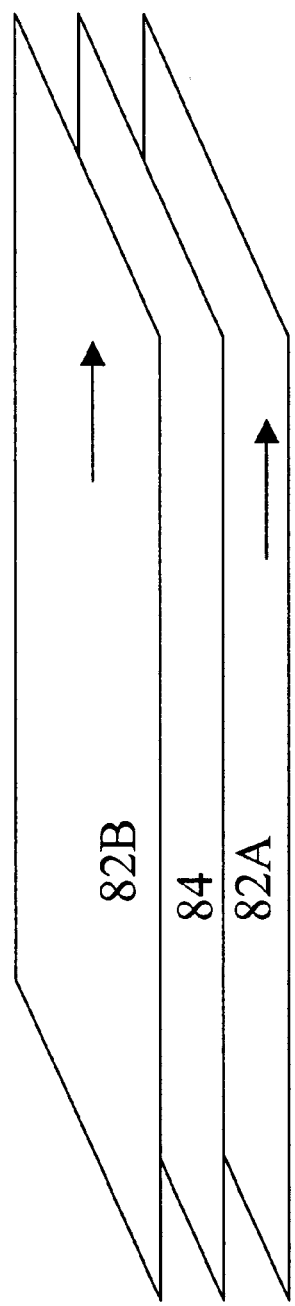
Figure 8E(3)
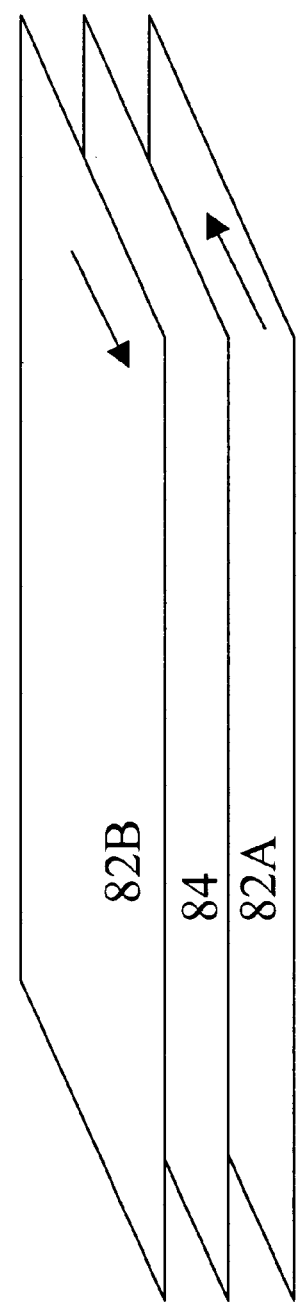
Figure 8E(4)

USE OF MULTI-LAYER THIN FILMS AS STRESS SENSOR

RELATED APPLICATIONS

The present application is related to and claims priority from U.S. application Ser. No. 09/500,706, filed Feb. 9, 2000 and U.S. Provisional Application No. 60/144,843 filed on Jul. 20, 1999.

FIELD OF THE INVENTION

The present invention relates to Giant MagnetoResistive (GMR) devices in conjunction with micromachined beams to measure stresses with high sensitivity, and methods of making and using the same.

BACKGROUND OF THE INVENTION

Stress and Pressure Sensors

The GMR effect has been widely reported in multi-layer thin film sensors, where there are alternating ferromagnetic layers 12, made from materials such as Cobalt, Iron or Nickel, separated by nonmagnetic conductor layers 14, such as chromium or copper to form a sensor 10 such as illustrated in FIG. 1. When a current is passed along the length direction of the sensor, the electrical resistance of the multi-layer stack of films varies as the relative angle between the magnetizations of the individual ferromagnetic layers, as shown in FIG. 1. The resistance is minimum when the magnetization vectors between the neighboring ferromagnetic layers are parallel to each other, and is maximum when the two vectors are antiparallel to each other (at 180°), as shown in FIG. 2. It is to be noted that this is in contrast to the conventional AMR effect, where the resistance is maximum when the magnetization vector within a single magnetoresistive film is parallel to the direction of the current, and minimum when it makes an angle of 90° to the direction of the current. The AMR effect is shown in FIGS. 3 and 4.

Typically, the change in electrical resistance of a GMR multi-layer stack for a full. rotation of the magnetization vector from a parallel to an antiparallel state can be anywhere from 2% to greater than 50%, and for the AMR effect, the change in resistance for a 90° rotation is 1.5–3.5%.Therefore, if the magnetizations of some layers in a GMR multi-layer stack can be made to rotate under the application of a magnetic field, the GMR stack theoretically will provide a greater sensitivity magnetic field sensor than a conventional AMR film. However, one challenge in doing this is that the exchange coupling magnetic field between the alternating ferromagnetic layers in a GMR stack is very large, on the order of 2000 Oersted. As a result, to make an individual ferromagnetic layer rotate in relation to a neighboring ferromagnetic layer requires enormous magnetic fields. If the interlayer distance between the neighboring ferromagnetic layers is increased to reduce the exchange coupling field between the layers, then the GMR ratio (percentage resistance change) decreases correspondingly. As a result, it has not been possible to exploit the full extent of the classical GMR effect.

One approach to overcome the problem described above is the spin valve magnetic field sensor, a device that utilizes a version of the GMR effect. The spin valve essentially consists of two ferromagnetic layers 52 and 54 separated by a nonmagnetic conducting spacer layer 56 as shown in FIG. 5. Of these two layers 52 and 54, layer 54 is a "pinned layer", in which the magnetization vector is pinned in one direction.

The other layer 52 is a soft ferromagnetic layer, called the "free layer", whose magnetization vector is free to rotate in the plane of the film. The separation between the pinned layer 54 and the free layer 52 is chosen such that the coupling field between the two layers is not too large. In the quiescent state, the magnetization of the free layer 52 is oriented at 90° to that of the pinned layer 54, as shown by the bold arrow in FIG. 5. Under the application of a relatively weak magnetic field, the rotation of the magnetic moment of the free layer 52 (as shown by the dashed arrows in FIG. 5) leads to a change in the relative angle of the magnetization between the pinned layer 54 and free layer 52, and results in a change in resistance of the device.

FIG. 6 depicts a typical resistance change of the device as a function of the applied magnetic field to the device. In the quiescent state, the resistance of the device is represented by the point X on the graph, and the change in resistance is linear for changes in magnetic field almost up to the point of saturation of the device as shown in FIG. 6.

The magnetization vector of the pinned layer in a spin valve device is usually held in place through antiferromagnetic exchange coupling between the pinned layer and a hard magnetic material (the "pinning layer" 58 shown in FIG. 5 for example) such as CrMnPd, PtMn, FeMn, NiMn, etc. Other methods to fix the magnetization of the pinned layer include permanent magnet biasing, current induced biasing, etc.

The classical Giant MagnetoResistive (GMR) effect, as it is described above, has also been contemplated as being used to measure mechanical strain induced by stress. This principle involves generating a rotation of the magnetization vector of the ferromagnetic film under the application of mechanical stress even in the absence of a magnetic field, which results in a resistance change of the film, which in turn can be used to infer the degree of stress. However, one still needs to overcome the large exchange coupling field between the alternating ferromagnetic layers, and in order to do this, it has been suggested to use an externally applied magnetic field to aid the rotation of one of the layers under an applied stress, and to measure the resulting change in resistance. However, in practice, this is very difficult to implement, since it is not possible to apply such large magnetic fields in sensors that are widely deployed in the field. Additionally, this method causes serious accuracy problems, since the effects of the externally applied magnetic field and the stress on the sensor need to be decoupled.

It has also been suggested, such as in U.S. Pat. No. 5,856,617, to use a in valve device of the type described above to measure strains in the cantilever tip of an atomic force microscope. In such a suggested strain gauge device, an example of which is illustrated in FIG. 5, the free layer 52 is made to be of non-zero magnetostriction, so that under zero magnetic field conditions, the free layer magnetization vector rotates under the application of stress to the cantilever beam, and the resulting change in relative magnetization vector angle between the free layer 52 and the pinned layer 54 leads to a resistance change in the device. The strain gage device is thus a conventional top spin valve, with the free layer 52 comprising an alloy of NiFe, Ni and Co and being deposited directly onto the substrate, a non-magnetic conducting layer 56 disposed between the free layer 52 and the pinned layer 54, and with the antiferromagnetic (AFM) layer 58 that is used for pinning the pinned layer 54 being on top of the stack. Although this device may find some use in measuring strains on atomic force microscope cantilever tips, there are several disadvantages to the use of this device as a general purpose strain gauge. The device's drawbacks relate mostly to the performance, reliability and processing limitations that are inherent with this type of design, and are listed below.

First, since an antiferromagnetic (AFM) layer 58 is used to pin the pinned layer 54 through exchange coupling, the device is subject to reliability concerns, since extended exposure of the AFM material to elevated temperatures around 150–200 C can cause "depinning" of the pinned layer, which destroys the effectiveness of the sensor. This is especially true if the antiferromagnetic material that is chosen has a low "Blocking temperature" (the temperature at which the antiferroniagnet starts to lose its exchange anisotropy). Furthermore, if the AFM material chosen is one that needs high temperature annealing, this introduces other processing problems such as the compatibility of the film with the substrate on which the multi-layer stack is being deposited, due to thermal mismatch concerns and delamination of the stack. Moreover, most manganese based AFMs have poor corrosion resistance.

Second, it is very difficult to maintain the magnetization of the free layer 52 to be pointing in a direction that is at 90° to the pinned layer 54 in the quiescent state. There are several competing magnetic torques that affect the net quiescent state magnetic moment of the free layer, including the intrinsic stresses, the shape demagnetizing fields, current induced fields, interlayer coupling fields with the pinned layer 54, and finally the intrinsic anisotropy of the free layer 52. It is very difficult to balance all these moments to arrive at a final moment vector that is pointed at 90° to the pinned layer 54. This is especially true at the edges of the sensor. As a result, there is a corresponding reduction in the sensitivity, and error in the linearity and offset of the device.

Third, using the configuration such as described above, there are several problems associated with stability of the device, since the free layer 52 is magnetically very soft. During the measurement of stress and strain, even very small magnetic fields in the vicinity of the device can affect the rotation of the free layer magnetization. This is further compounded by problems at the edges of the sensor, where stress effects and other demagnetization effects apply torques on the magnetization vector of the free layer 52. Therefore, it is desirable to have a free layer 52 that is relatively insensitive to small extraneous fields.

Fourth, it is difficult to process the device and deposit the multi-layer thin films on specialty substrates, such as Teflon or other flexible substrates like kapton on which the strain is to be measured. This is due to the fact that most AFMs require elevated temperature annealing steps to get the required magnetic properties. Elevated temperature annealing on such specialty substrates is likely to introduce severe stresses due to thermal mismatch, and peeling due to lack of adhesion.

Fifth, it is very difficult with this sensor to separate out the intrinsic effects of the strains developed within the films due to thermal mismatches between the substrate and the device during elevated temperature processing or operation of the device. Since the free layer is extremely sensitive to stresses, and it cannot separate between an externally applied stress and an intrinsic stress introduced during processing, linearity may be lost due to processing stress, and random offsets maybe encountered in the field due to varying environmental conditions.

Sixth, this strain gauge is limited to realizing a total GMR response of about 3–5%. Noting that this response corresponds to a complete 180° relative change in angle between pinned and free layer magnetization vectors, the design described allows only half of the total GMR effect to be realized, since the maximum difference in angle between the pinned and free layer magnetizations between the quiescent state and the fully stressed state at zero magnetic field is only 90°, and not 180°. Therefore, it is unlikely that one can obtain a resistance change greater than 3–4% with this design.

Seventh, if the device is used to measure both tensile and compressive stresses simultaneously, the maximum signal output is reduced to one fourth of the total GMR response for either sign of stress, and linearity of the response is compromised.

Eighth, it is difficult to separate the temperature induced drift in the sensor due to an inherent material characteristic called the "temperature coefficient of resistance (TCR)". The TCR denotes the change of quiescent resistance of the device at zero field, zero stress conditions as a function of the temperature. Typically, this number is about 0.15–0.2%/° C. for GMR sensors. When the sensor is being used as a strain gauge, however, it is difficult to separate out the resistance change of the sensor into ambient temperature induced effects and stress induced effects. As a result, strain gage measurement circuitry usually involves elaborate circuitry to compensate for the temperature induced changes in the sensor. A sensor such as the one described is subject to the same drawbacks as other typical piezoresistive sensors available today.

For all the reasons described above, it is necessary to make substantial improvements in order to realize a stress sensor that has high sensitivity (large response), good stability, and good reliability.

Use of Pressure to Image Fingerprints

The fingerprint sensing industry uses several different technologies to image fingerprints. The two most prominent technologies are optical based sensors and capacitance based sensors. Optical sensors use a light source, lenses and a prism to image the "ridges" and valleys on a fingerprint, based on differences in the reflected light from the features. The conventional capacitance sensor uses semiconductor type processing to fabricate a two-dimensional array of capacitors. The individual sensors form one plate of the parallel plate capacitor, while the finger itself, when placed on the array, acts as the second plate. Upon contact with the array of sensors, the individual distance from each sensor to the skin is measured using capacitive techniques. The difference in distance to skin at the ridges and valleys of a fingerprint provide the means to replicate the fingerprint. An example of the use of capacitive sensors to measure the spacing is shown in FIGS. 7A and 7B.

Both the above techniques fundamentally measure the spacing between the fingerprint features, and the sensor. The measurement of spacing is inherently subject to several distortion effects: since the height difference between the ridges and valleys is only of the order of 50 microns, any parameter which affects the spacing between the finger and the, sensor will affect the measurement. For example, both types of sensors are very sensitive to the thickness of the protective coating. They are also sensitive to oils or grease on the finger, and the presence or absence of moisture on the finger. In addition, most of these sensors are affected by the ambient temperature at the time of sensing. Under very hot or very cold conditions, the capacitive sensor can provide erroneous readings. The combined effect of all these variables results in a very distorted image of the fingerprint, as shown in FIG. 7C.

As a result of the above drawbacks to spacing based reproduction of fingerprints, it would be very useful to be able to use the difference in pressure exerted by the ridges and valleys of a fingerprint on a sensor to replicate the fingerprint image. In principle, a pressure based fingerprint sensor would be impervious to the drawbacks listed above, such as wet or dry conditions on the fingertip, presence of oil or grease on the fingertip, thickness of protective coatings, etc, and would produce a "digital" response, depending on whether the sensor experiences a ridge or not. This situation is illustrated in FIGS. 7D and 7E, where the pressure sensor can highlight only the ridges, which are the lines of interest in a fingerprint. However, due to a variety of factors, including the very low sensitivity and inability to provide the required resolution, pressure based sensors have not been deployed for the replication of fingerprints.

Accordingly, there remains a need for a device suitable for use as a stress and/or pressure sensor that has high sensitivity yet can provide high lateral resolution. Moreover, there further remains a need for a sensor that is suitable for use in fingerprint identification and verification that is less sensitive to adverse conditions such as extreme temperatures and skin oils and grease.

SUMMARY OF THE INVENTION

It is an object of the present invention to provide an improved GMR sensor.

It is another object of the present invention to provide a GMR sensor that does not require an additional layer to pin any ferromagnetic layer, but instead uses an external current source to properly bias the ferromagnetic layers.

It is another object of the present invention to provide a GMR sensor that allows both ferromagnetic layers to freely rotate, thus increasing the dynamic sensing range of the GMR sensor and allowing the entire GMR response to be sensed.

It is a further object of the present invention to provide a GMR sensor capable of sensing both compressive stress and tension.

It is a further object of the present invention to provide a GMR sensor that can be adapted to have substantial independence from temperature shifts.

Another object of the invention is to provide a GMR sensor that is suitable for use in fingerprint identification and verification.

Another object of the invention is to provide a GMR sensor that is suitable for use in fingerprint identification and verification and that is less sensitive to adverse conditions such as extreme temperatures and skin oils and grease. Another object of the invention is to provide a GMR sensor that is suitable for use in fingerprint identification and verification and that is less sensitive to transient ESD voltages, and also mechanical abrasion.

The present invention fulfills these and other objects of the present invention by providing a pressure sensing device that includes at least one GMR sensor, and preferably an array of GMR sensors, with each GMR sensor having a conducting spacer layer interposed between two ferromagnetic layers. In an unbiased state, the magnetization vector of each of the ferromagnetic layers is preferably parallel to each other. Upon application of a current, however, the magnetization vector of each ferromagnetic layer is changed, preferably to an antiparallel position, in which state the sensor is used to then sense stress applied thereto. Upon application of stress, the magnetization vectors of both free magnetic layers will rotate, thus causing a corresponding and proportionally related change in the resistance of the magnetic material of the sensor. This change in resistance can be sensed and used to calculate the stress applied thereto.

While the above provides an overview of the invention, there exist numerous other significant aspects and advantages that will become apparent in the discussion provided hereinafter.

BRIEF DESCRIPTION OF THE DRAWINGS

The above and other objectives, features, and advantages of the present invention are further described in the detailed description which follows, with reference to the drawings by way of non-limiting exemplary embodiments of the present invention, wherein like reference numerals represent similar parts of the present invention throughout several views and wherein:

FIGS. 7A–7E are side views of a fingertip on a prior art capacitive sensor, and on a potential pressure sensor according to the present invention which illustrate the use of spacing versus pressure for replicating the fingerprint, and the distortion associated with the prior art.

FIGS. 8A(1)–(3) are perspective views, not to scale, of a GMR strain gauge sensor with current biased free layers, according to a preferred embodiment of the present invention.

FIGS. 8D(1) and (2) are perspective views of other embodiments of a GMR strain gauge sensor with current biased free layers, according to a preferred embodiment of the present invention.

FIGS. 8E(1)–(4) are perspective views, not to scale, of a GMR strain gauge sensor with current biased free layers biased so as to be capable of sensing tension and compression, according to a preferred embodiment of the present invention.

DETAILED DESCRIPTION OF THE PREFERRED EMBODIMENTS

Figure 1:
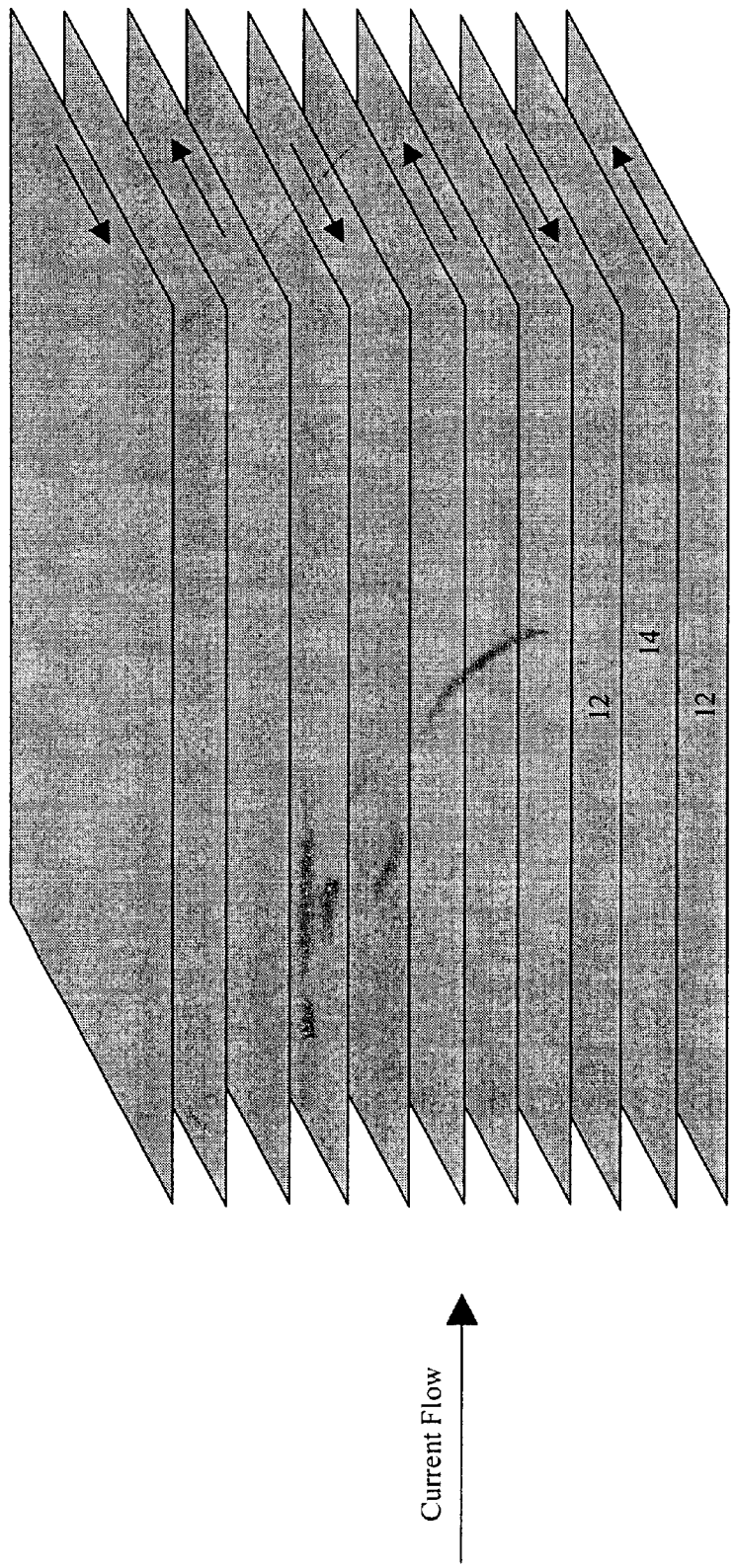
FIG. 1 is a perspective view of a prior art GMR multi-layer stack, using alternating ferromagnetic layers separated by non-magnetic spacers.

Before describing the initial preferred embodiment in detail, an overview of the concepts that are used by the present invention will be first provided. Subsequently, the preferred embodiments and alternative embodiments will be discussed. The rotation of the magnetization vector of a soft ferromagnetic layer that comes about from the magnetoelastic driving force is proportional to the product of the stress and the magnetostriction. The sensors of the present invention based upon this concept are essentially multi-layer thin film stacks, which are deposited onto the substrate to be monitored, and photolithographically patterned to have a high aspect ratio, where the length is greater than the width of the sensor. A uniaxial compressive or tensile stress in bending, acting upon the length of the sensor, produces a rotation of the magnetization vector of the soft ferromagnetic layer, even under the absence of an external magnetic field. A requirement for this magnetization rotation is the sensor's property of magnetostriction, which must be non-zero ($>+10^{-7}$ or $<-10^{-7}$), preferably $+/-10^{-5}$ and whose sign must be appropriate for the sign of the stress. The rotation of the magnetization in turn produces a change in the resistivity of the magnetic material, and, in the configuration wherein the current is flowing through the device, preferably along the long axis direction, causes a corresponding change in the output voltage.

This invention describes a preferred embodiment that uses an externally applied current as the pinning source to fix the magnetizations of the ferromagnetic layers. Specifically, the preferred embodiment includes two layers of ferromagnetic material (each of the layers typically a combination of NiFe, CoFe), separated by a thin non-magnetic conducting spacer material such as copper. The copper provides for a ferromagnetic coupling between the two ferromagnetic layers, such that their magnetizations are pointed in the same direction, which in the case of the preferred embodiment is along the length of the sensor. Each of the ferromagnetic layers is further made of a material of non-zero magnetostriction.

Under the application of a predetermined current, the field induced by the current is sufficient to induce a magnetic field in each of the ferromagnetic layers which tends to rotate the magnetization of each layer towards the width direction of the sensor. However, the magnetizations of the two layers tend to rotate in opposite directions, as dictated by the right hand rule. If the current is of sufficient magnitude, the field induced by the current is large enough to overcome the ferromagnetic coupling between the two layers and their anisotropy, and the magnetizations of the two layers orient themselves at 180° to each other, each pointing along the width direction of the sensor. This is the quiescent, zero-field, zero stress state of the device. The resistance of the sensor is maximum under this condition. If the two ferromagnetic layers are of substantially the same magnetic moments, the flux closure is complete and edge effects are eliminated, allowing for uniform magnetization over the entire film.

Under application of stress, for an appropriate combination of sign of magnetostriction and sign of stress along the length of the sensor, the magnetizations of the two ferromagnetic layers will now rotate back towards the length direction. As they rotate, the angle between their moment vectors decreases, and the resistance of the device decreases. One can thus use this resistance change as a measure of the stress. In the fully saturated state, the moments are parallel to each other along the length direction, and the resistance of the sensor is at a minimum.

With these principles having been set forth, the first preferred embodiment will be described with reference to FIGS. 8A(1)–8A(3), which illustrate a strain gauge sensor 80 that utilizes the GMR effect, but eliminates the AFM layer and the necessity to have the free layer oriented perpendicular to the pinned layer in the quiescent state. It also provides for realizing the entire GMR response, rather than just half the response from the sensor 80.

The sensor 80 preferably has a rectangular shape from a top view, with current flowing along the length axis of the sensor. The sensor multi-layer stack includes at least two ferromagnetic layers 82 as shown in FIG. 8A(1), with a nonmagnetic conductor spacer layer 84 such as copper between them. Both of these ferromagnetic layers 82 are free layers, with their magnetizations free to rotate under the presence of applied magnetic fields or stress. Both of the free layers have non-zero magnetostriction of the same sign and substantially the same magnitude. The thickness of the free layers 82 can range from 0.5–15 nm (typical value is around 5–8 nm) and spacer layer 84 thickness is chosen such that there is a weak ferromagnetic coupling between the two ferromagnetic layers, without unduly compromising the GMR response. The thickness of this spacer layer 84, when copper is used, is typically in the range of 0.1–10 nm in order to provide appropriate coupling. Leads 85 are connected to each length end of the device to provide for passing a known current through the device and measuring the resulting voltage of the device.

In the as deposited state, the magnetization in each individual ferroinagnetic layer 82 is pointed in a direction along the length of the sensor 80, as shown in FIG. 8A(1). The ferromagnetic coupling field between the two layers 82 (shown in detail as 82A and 82B, which are referred to specifically when needed) ensures that the magnetizations are therefore parallel to each other in the absence of a bias current. However, when a bias current of sufficient magnitude is applied, a current induced field is generated in each of the ferromagnetic layers 82 as dictated by the right hand rule. This current induced field tends to align the magnetizations in each of the layers along the width direction, but to be antiparallel (180°) to each,other, as shown in FIG. 8A(2).

In a typical design for such a sensor 80, one should consider the bias current requirements to align the magnetizations of the two ferromagnetic layers 82 to be antiparallel to each other in the zero stress, zero field state. The ferromagnetic coupling between the two ferromagnetic layers 82 is in the range of about 2–5 Oe for a copper thickness of 2–4 nm. Since there is an added intrinsic anisotropy of 5 Oe for both of the layers 82 in the length direction, a current induced field of about 7–10 Oe is needed in order to completely rotate the magnetizations of the two layers 82 towards the width direction, as shown in FIG. 8A(2). The field induced by the current in each of the layers is given by $$H_{current} = H_I = (4_\pi/3)I/w \qquad \text{Equation 1}$$

where I is the current in milliamps, and "w" is the width of the sensor in microns. Assuming a sensor width of 2 microns, a current between 3–5 mA would completely rotate the magnetizations of the ferromagnetic layers 82 to the width direction.

In a zero stress, zero field state, under the application of sufficient bias current as dictated by the design criteria above, the moments, or magnetization vectors, of the two free layers 82 become antiparallel to each other, aligned along the width direction of the sensor 80, resulting in a maximum resistance. In the case where the as deposited anisotropy of the free layers ($H_k$) is in a direction along the length axis, for a full rotation of the magnetization vectors into an antiparallel configuration under the application of a bias current, we define the minimum required current, $I_{min}$, as occurring when $$H_I > (H_{ILC} + H_k + H_{ch}) \qquad \text{Equation 2a}$$

where $H_{ILC}$ is the interlayer coupling field and $H_{ch}$ is the hard axis coercivity which also needs to be overcome by the bias current for rotation of the magnetization vector It is to be noted that this treatment is for one embodiment and does not take into account other embodiments where the intrinsic anisotropy $H_k$, is pointed in a direction along the width of the sensor; nor does it consider the effect of the relative magnitudes of $H_k$ and $H_{ILC}$. These other embodiments are just as viable as stress sensors, except that the current requirements will change depending on the specific embodiment used.

Equation 2a can be rewritten as $$I_{min} = (3w/4_\pi)^*(H_{ILC} H_k + H_{ch}) \qquad \text{Equation 2b}$$

Now we consider the effect of an externally applied stress on the magnetization vector of the ferromagnetic films, and thus the resistance of the multi-layer stack. The stress induced anisotropy field on ferromagnetic materials has been well documented and understood; see, for example, A. C. Tam and H. Schroeder, "A New High-Precision Optical Technique to Measure Magnetostriction of a Thin Magnetic Film Deposited on a Substrate", IEEE Transactions on Magnetics, Vol. 25, No. 3, May 1989, pp. 2629–2637). This stress induced field is given by $$H_\sigma = 3\lambda_{(\sigma)}/M_s \qquad \text{Equation 3}$$

where $H_\sigma$ is the stress induced anisotropy tending to rotate the magnetic moment of the free layers, $\lambda$ is the magnetostriction of the free layer, $\sigma$ is the incremental uniaxial applied stress on the film, and $M_s$ is the saturation moment of the alloy used for the free layer. If $\lambda > 0$, the stress induced anisotropy tends to rotate the magnetization in the direction of tension ($\sigma > 0$); whereas if $\lambda < 0$, it tends to rotate the magnetization in the direction of compression ($\sigma < 0$).

The sign of the magnetostriction of the free layers 82 is chosen such that, under the application of stress to the beam that serves as the substrate for the multi-layer stack, the magnetizations of both the free layers will rotate towards the length direction of the beam. As the magnetizations rotate, the angle between their moment vectors decreases, and the resistance of the multi-layer stack decreases. One can thus use this resistance change as a measure of the stress. The orientation of the intrinsic anisotropies of the ferromagnetic layers 82, and the ferromagnetic coupling between them will ensure that their magnetic moments will align themselves to be parallel, rather than antiparallel, under the application of stress, as shown in FIG. 8A(3). With the two moment vectors now parallel, the resistance of the device is at a minimum.

As an example, if the two ferromagnetic free layers are made of negative magnetostriction, and if a compressive stress is applied along the length direction of the sensor 80, the magnetizations of the two layers 82 tend to rotate back towards the length direction of the sensor. Due to the weak ferromagnetic coupling, they rotate towards each other to be in a parallel state, resulting in a decrease in resistance until it reaches a minimum.

Quantitatively, under the application of stress, the minimum condition for a full rotation of the magnetization vectors back to a parallel configuration to counteract the effect of the bias current can be written as $$H_\sigma = H_I \qquad \text{Equation 4}$$

This equation suggests that the two externally induced magnetic torques, the current induced anisotropy and the stress induced anisotropy fields have to be considered together in determining the final magnetization vector direction of the ferromagnetic layers. When Equation 4 is satisfied, the magnetization vectors of the two ferromagnetic layers are parallel to each other and pointed along the length direction of the sensor, and the resistance of the sensor is at a minimum. When $H_\sigma < H_I$, the magnetization vector points at an angle $\theta$ to the width direction dictated by the equation $H_\sigma/H_I = \sin\theta$. When there is no stress, and the layer magnetizations are biased by current only, the resistance of the device is at a maximum.

Figure 8B:
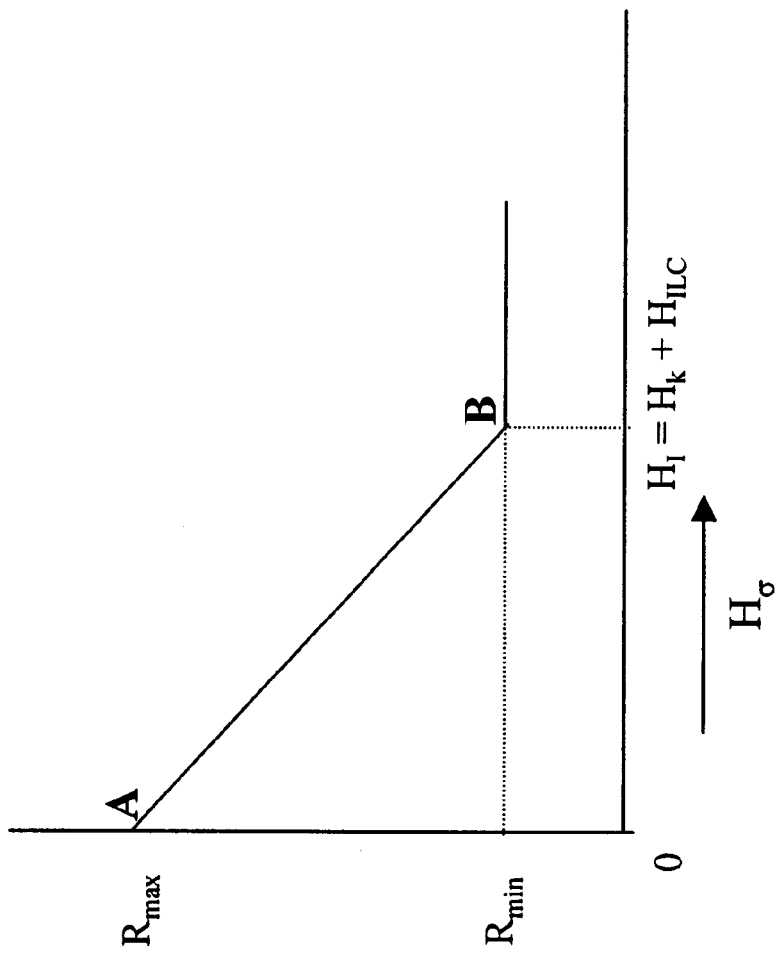
FIG. 8B is a graph illustrating the resistance response of the strain gauge sensor of the preferred embodiment as a function of the stress induced field.

These principles are illustrated in FIG. 8B, which plots the variation of device resistance as a function of the stress induced anisotropy. Point A represents the resistance under zero applied stress, and Point B represents the state when the stress induced anisotropy exactly cancels the current induced anisotropy.

In order to quantitatively calculate the gauge factor or sensitivity of this strain gauge, one can analyze the transfer curve of FIG. 8B. We first calculate the slope of this transfer curve by noting that under the application of stress, the maximum resistance change $_\Delta R_{max}$ in FIG. 8B occurs as soon as the stress induced anisotropy field ($H_\sigma$) equals the current induced anisotropy field ($H_I$), as long as $I > I_{min}$.

Consequently,

For $H_\sigma = H_I$; $_\Delta R = _\Delta R_{max}$ for $I > Imin$ or $(H_\sigma/H_I) = (_\Delta R/_\Delta R_{max})$ for $I > I_{min}$ where $_\Delta R$ is defined as $-Rmax - R$).

From equations 1 and 3, this can be written as $$(3\lambda_{(\Delta\sigma)} * 3 * w/4_\pi \cdot _I \cdot M_s) = (_\Delta R/_\Delta R_{max}) \text{ for } I > I_{max}$$

or $$(_\Delta R/_\sigma) = 9_\lambda w_\Delta R_{max}/4_\pi \cdot _I \cdot M_s) \text{ for } I > I_{min} \qquad \text{Equation 5}$$

Figure 8C:
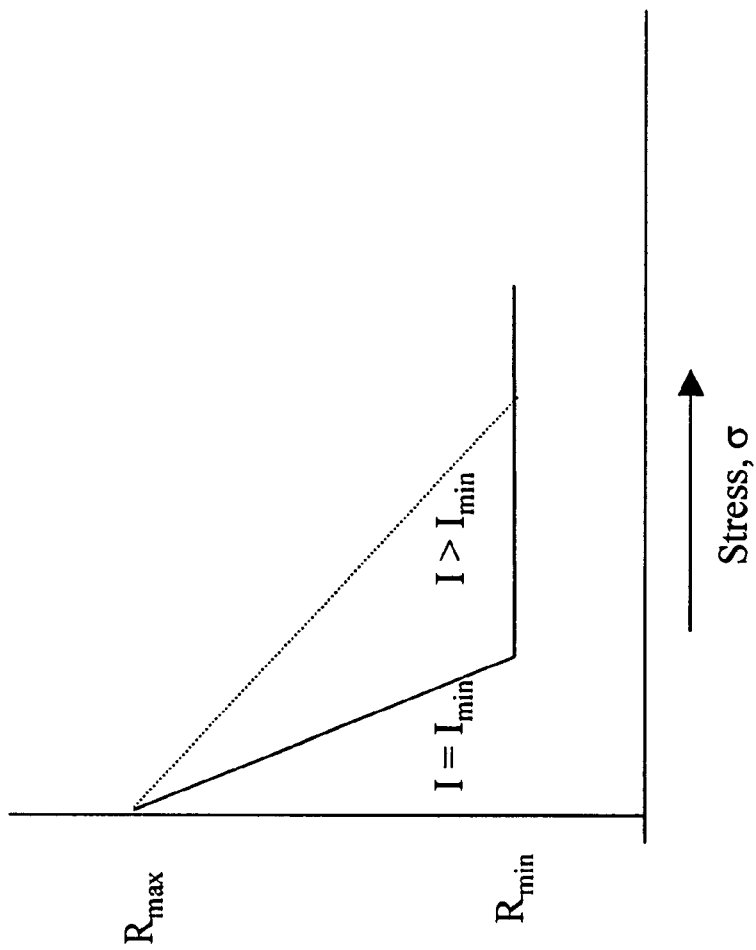
FIG. 8C is a graph illustrating the resistance response of the strain gauge sensor of the preferred embodiment as a function of the applied stress for varying sense currents.

This equation is plotted in FIG. 8C, illustrating the dependence of resistance on applied stress, and the effect of changing the bias current.

In order to calculate the sensitivity of the strain gauge, we rewrite the variation of resistance with strain rather than stress:

$$(_\Delta R/_e) = E(9_\lambda w_\Delta R_{max}/4_{\pi}\cdot _I\cdot M_s) \text{ for } I > I_{min} \quad \text{Equation 6}$$

where E represents the Young's modulus of the film.

It is instructive to insert some typical values into Equation 6 and obtain an estimate for the gauge factor for the device proposed. With W=$2_\mu$m
$_\lambda$=1–2 e-5
E=2.4e11 dyne/sq.cm.
$_\Delta$R=0.08–0.12
$M_s$=1000 emu/cc
I=5 mA
GF=550–1500

Equation 6 illustrates quantitatively the dependence of the strain gage performance on different parameters. Therefore, in addition to affecting the gauge factor of the strain gauge through choice of materials (primarily by varying the magnetostriction), the sensitivity of the strain gauge sensor depends on the magnitude of the current used to bias the sensor, the width of the sensor and the magnitude of the GMR response $R_{max}$. By increasing the current beyond the minimum bias current, $I_{min}$, the sensitivity of the strain gauge can be reduced, but the dynamic range of strain increases correspondingly.

The performance of the sensor 80 illustrated in FIG. 8A can be enhanced by adding layers in addition to the layers previously discussed to obtain enhanced GMR response and maximum reliability. For example, as shown in FIG. 8D(1) a buffer underlayer 86 of high resistance material such as Tantalum is typically deposited below the ferromagnetic layer 82A to ensure epitaxial growth of the ferromagnetic layers. Similarly, the stack is "capped" off by another similar buffer layer 88 such as tantalum or ruthenium over the ferromagnetic layer 82B to prevent oxidation of the materials of the stack, and to aid further processing of the material. Improvements can be made in the GMR response by adding other or additional underlayers, such as, for example, an underlayer 86A of $Ni_{48}Fe_{12}$ $Cr_{40}$ alloy just below the lower ferromagnetic layer 82A. This layer of Ni—Fe—Cr can either replace the Tantalum underlayer 86, or be deposited between the Tantalum buffer underlayer 86 and the ferromagnetic free layer 82A, as illustrated. This layer serves to improve the GMR response by affecting the epitaxial growth morphology of the ferromagnetic layers.

In addition, FIG. 8D(2) illustrates other layers that can be added that can improve performance. As shown, although the free layers 82A and 82B are a soft magnetic material such as Ni—Fe, it is typical to include a thin interlayer, shown as 83A and 83B, of a material, such as Cobalt, or an alloy of Co—Fe with a thickness of 0.2–2 nm at each interface of the free layers 82A and 82B with the spacer layer 84 to enhance the GMR effect, and also to prevent interdiffusion between the Ni—Fe of the free layers 82 and the copper of the spacer layer 84. Additionally, the use of a metal oxide layer 89 such as NiO, or a metal layer such as gold, with a thickness of about 5 nm for specular reflection can be used to increase the GMR response. The NiO layer 89 is placed between the upper ferromagnetic free layer 82B and the tantalum capping layer 88, and improves the GMR response by eliminating the diffuse scattering of electrons at the interface between the upper ferromagnetic layer and the tantalum capping layer of the stack. The specular reflecting metal oxide layer can also be used as a substitute to the Ni—Fe—Cr underlayer 86A for the lower ferromagnetic layer 82A.

Figure 2:
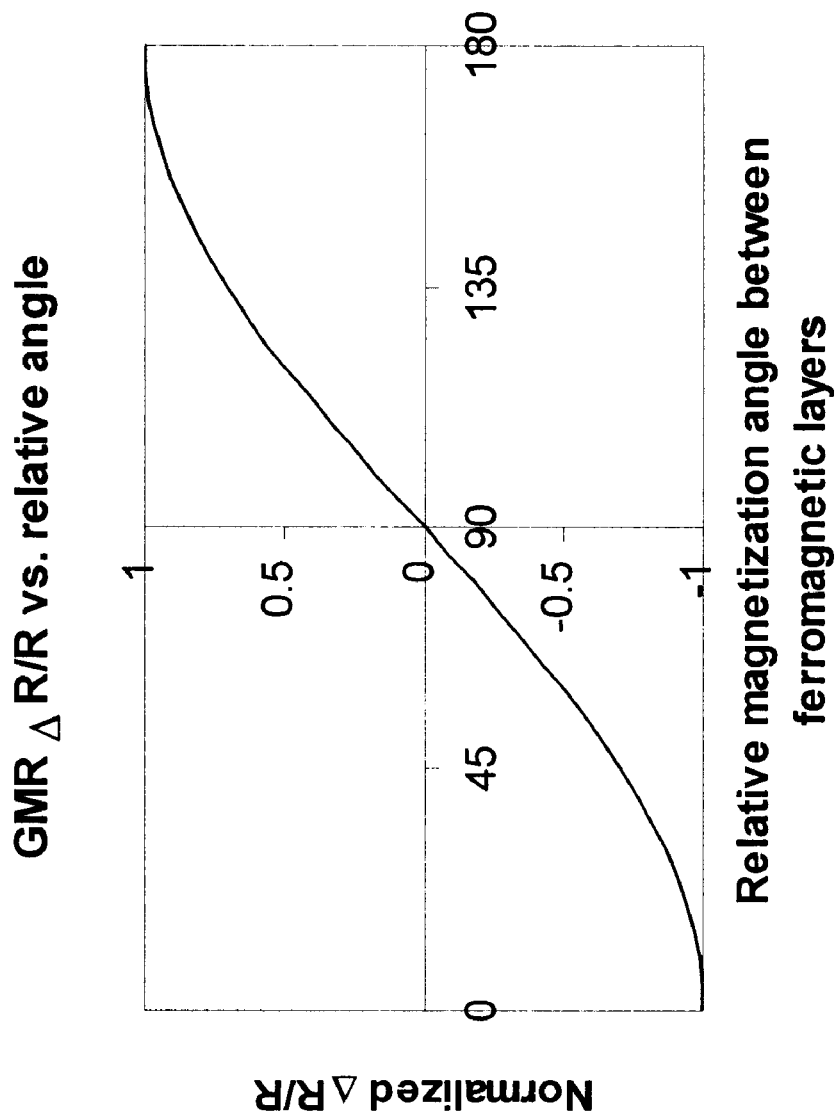
FIG. 2 is a graph illustrating the resistance response of a GMR multi-layer stack to changes in relative angle between the alternating ferromagnetic layers.
Figure 3:
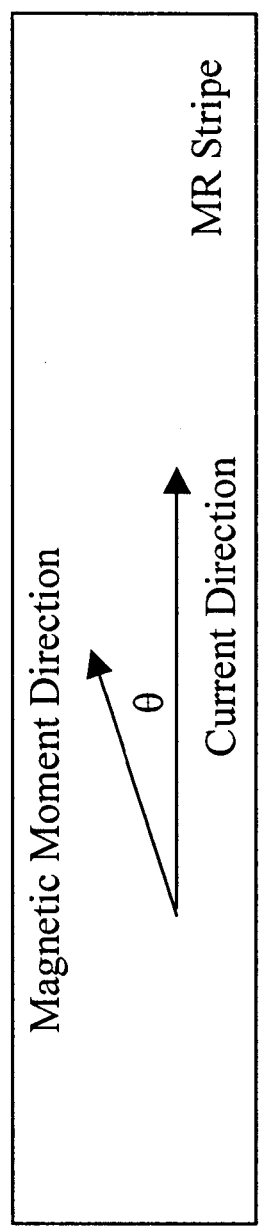
FIG. 3 is a top view of a prior art MR layer, illustrating the angle between the magnetization direction and the current direction.
Figure 4:
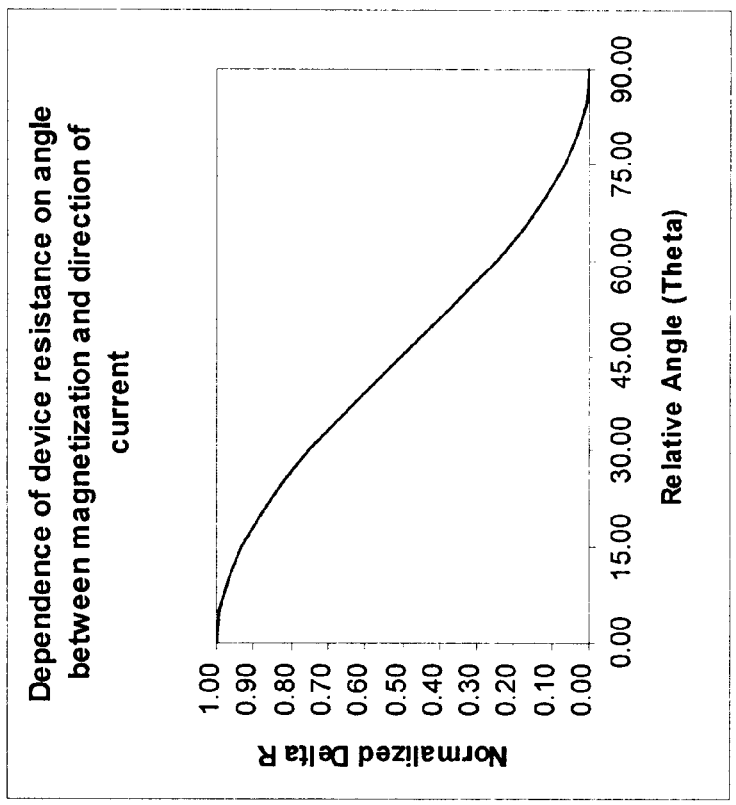
FIG. 4 is a graph illustrating the resistance response of the prior art MR layer stack to changes in relative angle between the magnetization vector and the current direction shown in FIG. 3.
Figure 5:
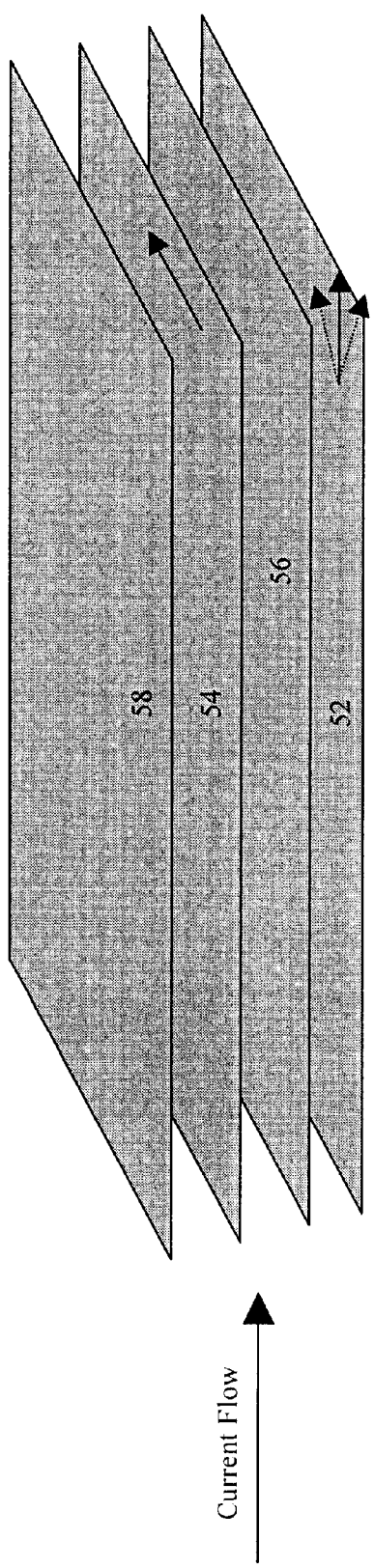
FIG. 5 is a perspective view of a prior art spin valve, using a pinned ferromagnetic layer and a free ferromagnetic layer, separated by a non-magnetic spacer.

The entire stack of thin films as described above is deposited onto a substrate that is shaped in the form of a membrane or a beam, as shown in FIGS. 8D1 and 8D2. After deposition onto the membrane or beam, the multi-layer stack as described above is patterned into a rectangular shape using photolithography techniques. The sensor is positioned at a predetermined location on the beam, such that it experiences a maximum state of stress. The prior art for the locations of maximum state of stress in a beam or membrane under load are well documented. If the length and width dimensions of the sensor are made small enough relative to the length and width dimensions of the beam, then a uniform state of stress is introduced over the surface area of the sensor, and one can expect a linear response from the sensor. The membrane or beam is designed to flex under the application of a stress in the vertical direction as shown in FIGS. 8D(1) and 8D(2), such that there is either a tensile or compressive stress.

As mentioned previously, this embodiment corrects several of the problems associated with the conventional GMR sensor used for stress sensing. First, it eliminates the use of the AFM layer, by using current to pin the sensor in the quiescent state. In addition the ease of processing the wafer (the entire wafer can now be processed using a low temperature process without any high temperature annealing) also provides for better reliability by reducing the susceptibility of the sensor to delamination from the substrate due to differences in coefficient of thermal expansion. It also reduces susceptibility of the sensor due to the absence of manganese based AFM alloys.

Second, this embodiment obviates the need for the free layer to be aligned at 90° to the pinned layers in the as deposited state through delicate balancing of the different magnetic torques on the free layer. The use of a bias current is very effective in setting the magnetizations of both the free layers in the antiparallel state, resulting in a known condition prior to stress measurement. The use of a bias current, combined with efficient flux closure between the ferromagnetic layers also eliminates the role of edge instabilities in the magnetization of the free layer.

A third advantage of this embodiment is that one can realize the entire GMR response because, in the quiescent state (with sufficient current and in a zero stress state), the resistance is maximum when the magnetizations are at 180° to each other, whereas under the application of stress in the saturated condition, the magnetizations are parallel, resulting in a minimum resistance.

Figure 6:
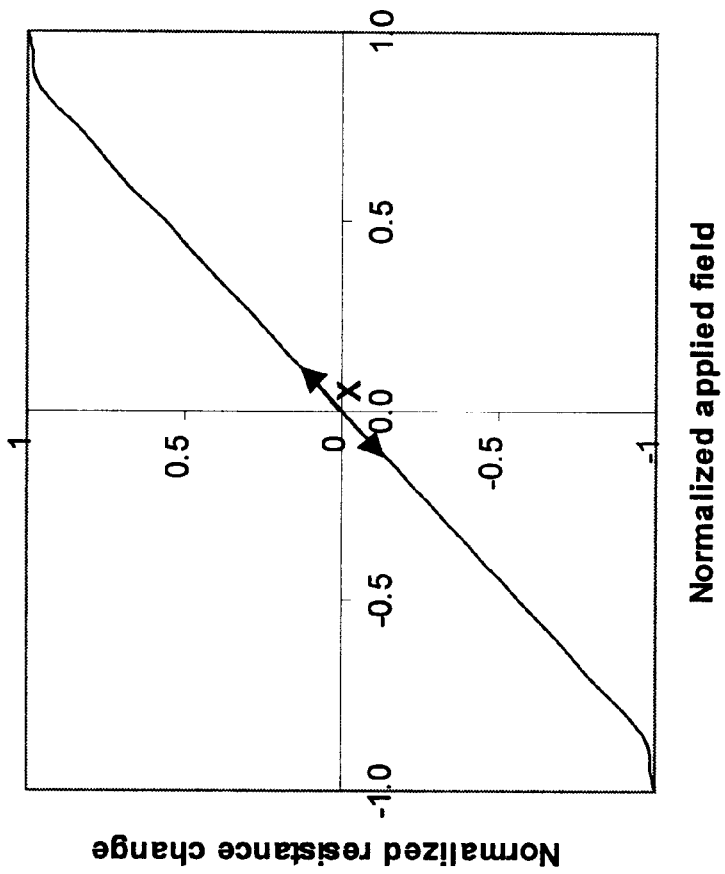
FIG. 6 is a graph illustrating the resistance response of the prior art spin valve to changes in relative angle between the pinned and free ferromagnetic layers shown in FIG. 5.
Figure 7D:
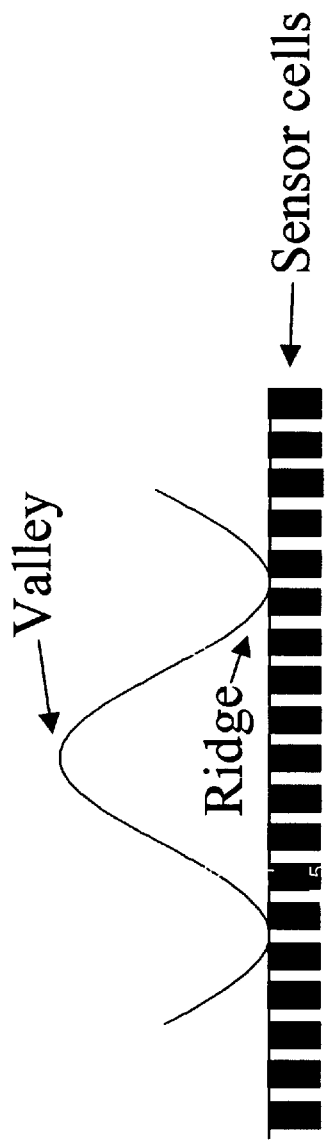
Figure 7E:
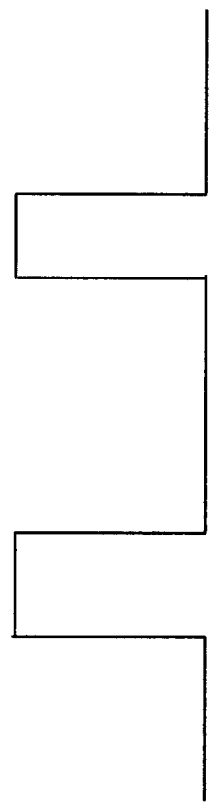

A fourth advantage of this preferred embodiment is the ability to detect both signs of stresses simultaneously using the same sensor, which will now be described with reference to FIGS. 8E(1)–8E(4). The sensor 80 is physically the same as in the embodiments of FIG. 8A or 8D, as illustrated in FIG. 8E(1). In order to sense both signs of stresses simultaneously, however, the current through the sensor is adjusted such that, in the quiescent state under zero stress conditions, the current induced field in each of the two neighboring ferromagnetic layers 82 is oriented at an angle of 45° to the direction of current, as shown in FIG. 8E(2). As a result, the two magnetizations are now at 90° to each other, and the resistance is at the midpoint of the curve in FIG. 6, denoted by X. If the two ferromagnetic layers 82 have negative magnetostriction, for example, then the application of a uniaxial compressive stress along the length of the sensor causes the magnetizations of each of the films to rotate towards each other, and towards the length direction of the sensor, as shown in FIG. 8E(3). The resistance of the device therefore decreases under these conditions. However, if the sensor experiences uniaxial tension along the length of the sensor, the magnetizations now rotate away from each other, towards the width direction of the sensor as shown in FIG. 8E(4), resulting in an increase in resistance. One can thus operate the sensor 80 to detect both tension as well as compression in the sensor. The linear behavior of the GMR response curve ensures a linear response for a stress of either sign. The advantage of this embodiment over the prior art is that it allows one to realize twice the signal output for a stress of either sign.

The preferred embodiment of this invention also allows for automatic temperature compensation of the temperature induced drift of the sensor under varying ambient temperature conditions during the long term, continuous monitoring of stress. In order to separate out the temperature induced resistance change of the sensor from the stress induced resistance change, a current pulse of very small duration is passed through the sensor, typically on the order of milliseconds, but of sufficient magnitude to completely re-orient the magnetizations to their initial antiparallel state even under the presence of stress. The resulting resistance is noted, and represents the "quiescent state" resistance of the device, even though the sensor is experiencing stress, since the ferromagnetic layers have been instantaneously forced into an antiparallel state by the current pulse. However, this resistance also represents the resistance of the sensor at its ambient operating temperature, which resistance varies according to the temperature coefficient of resistance (TCR) of the device. It is possible to match this resistance using simple electronic circuitry against a previously determined, well calibrated curve of the resistance variation of the sensor as a function of current and temperature under zero stress conditions. The resistance change due to temperature and pressure can thus be separated.

The magnitude of the current pulse for temperature compensation is chosen according to Equations 1–4 above such that it is sufficient to rotate the magnetizations antiparallel to each other even under the presence of the largest stress that the sensor is expected to experience. This instantaneous current pulse ensures that the sensor goes back to its "quiescent state" of antiparallel alignment even under the application of stress.

Another significant advantage of the preferred embodiment lies in the ability of the user to adjust the response properties of the strain gage sensor in a dynamic fashion. FIG. 8C shows an example of this application. According to Equation 6, the sensitivity and dynamic range of the strain gauge sensor is inversely proportional to the applied current for any value of current greater than a predetermined minimum.

Figure 9:
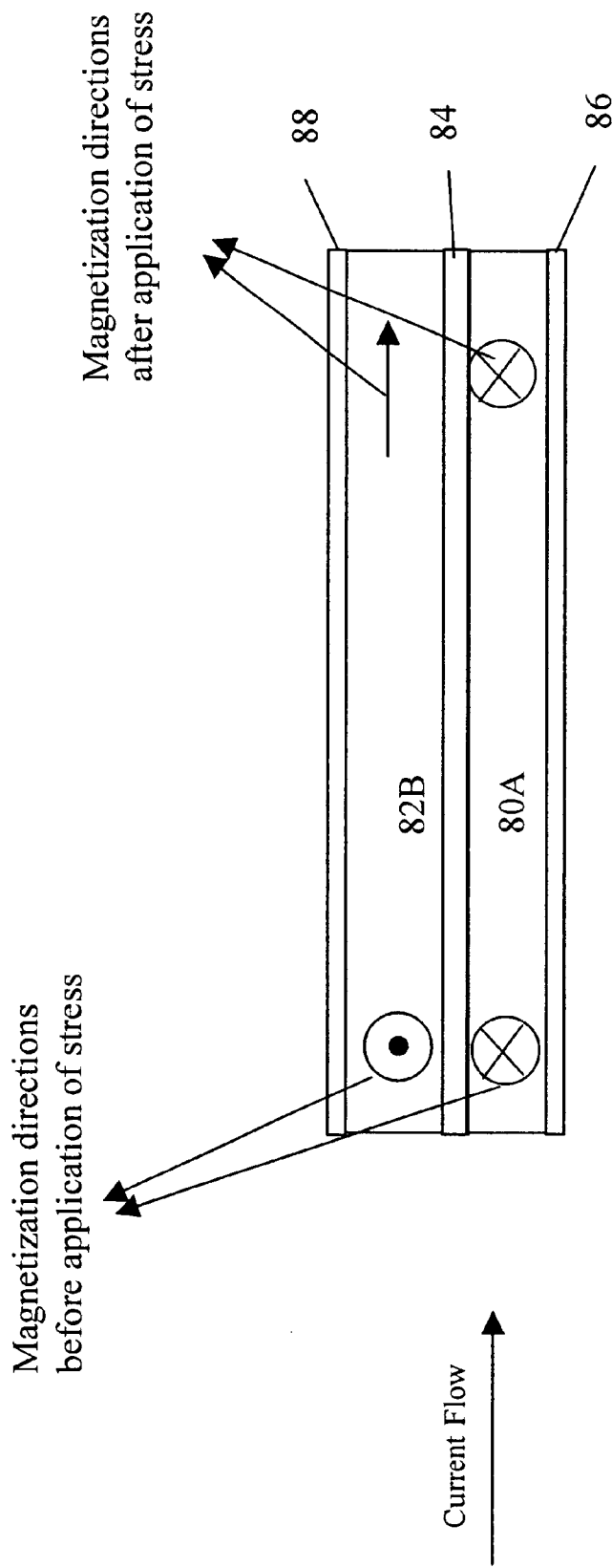
FIG. 9 is a side view, not to scale, of a GMR strain gauge sensor with current biased free layers, with one layer with non-zero magnetostriction, according to the present invention.

While the preferred embodiment with the operating conditions has been described above to obtain optimum performance and reliability, an alternative embodiment, as shown in FIG. 9, has a similar multi-layer stack structure to that of the preferred embodiment, and includes ferromagnetic layers 82A and 82B and a conducting spacer layer 84, as shown, and can also include, for example an underlayer 86 and a capping layer 88 as shown. However, in this case, one of the ferromagnetic layers has a non-zero magnetostriction of a certain sign to allow its rotation under the application of stress; while the other ferromagnetic layer has non-zero magnetostriction of a sign opposite to that of the first layer. FIG. 9 illustrates this as ferromagnetic layer 82A having the non-zero magnetostriction, and ferromagnetic layer 82B having a magnetostriction of opposite sign. Under the application of a sufficient sense current, in a manner similar to that described above, the magnetization vectors of the two layers 82 align, preferably in a manner that is antiparallel to each other, resulting in maximum resistance. Under the application of stress, either tensile or compressive, however, in a zero field condition, only the magnetization vector of one of the free layers rotates, and in the fully saturated state, it aligns itself at 90° to the magnetization of the other ferromagnetic layer. One can thus realize half of the total GMR response from such a structure. In this configuration, if the two free ferromagnetic layers have magnetostrictions of opposite sign, one can sense stresses of either sign, either tensile or compressive. In this case, the sensor will provide the same type of output signal regardless of whether the applied stress is compressive or tensile in nature. This type of configuration is useful when it is desirable to detect just the presence of stress, regardless of whether it is tensile or compressive.

Pressure Sensor Application of the GMR Sensor

Figure 10:
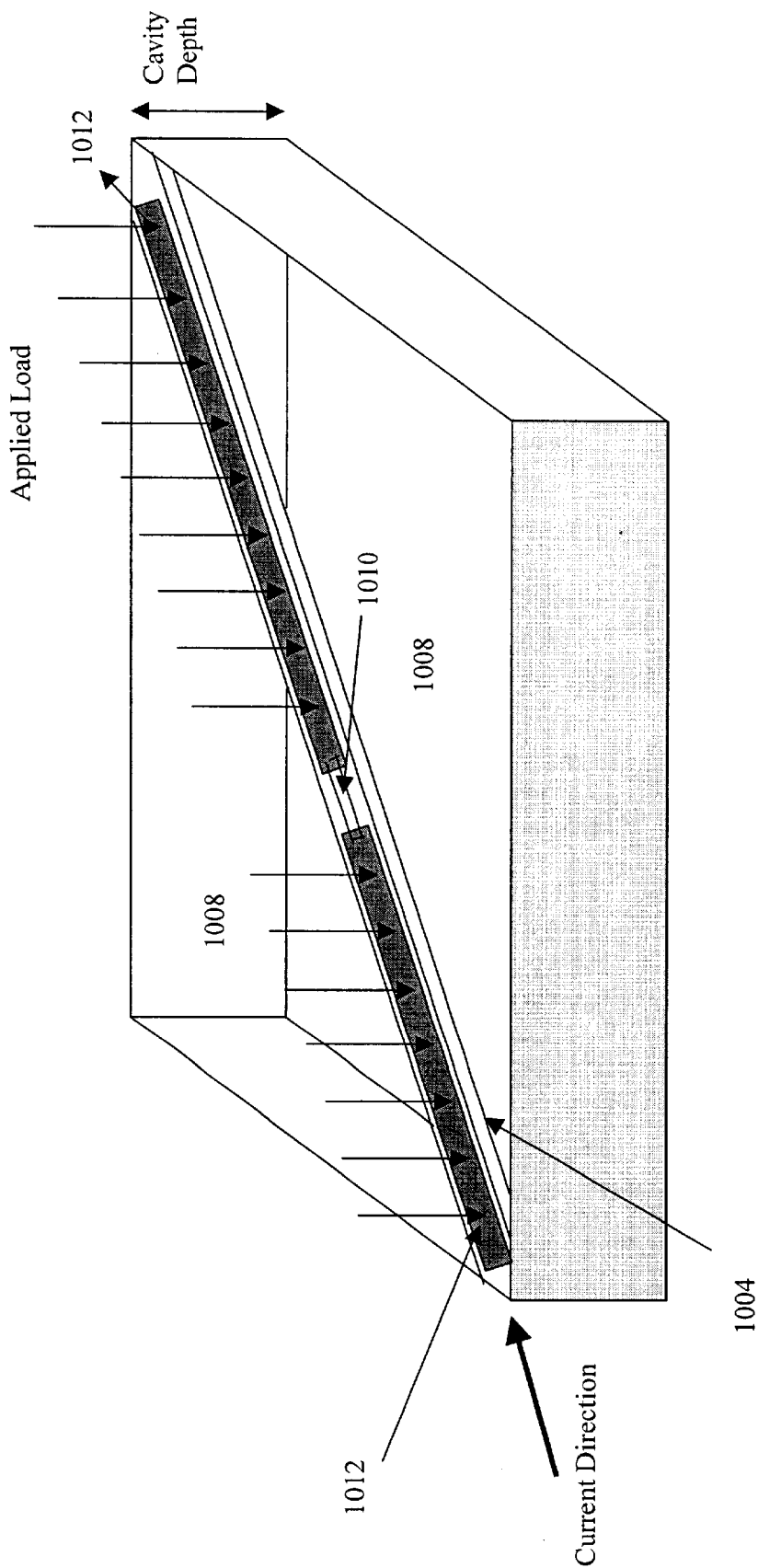
FIG. 10 illustrates a beam or diaphragm substrate on which a giant magnetoresistive sensor is deposited and patterned in accordance with the invention.

In accordance with an aspect of the invention, a multi-layer stack 1010 is the basis for a novel stress or pressure sensor, which can be used, for example, for fingerprint sensing. In order to use it, the underlying base structure for the GMR sensor 1010 is fabricated as a suspended bridge, a cantilevered beam 1004 or a similar kind of membrane that is supported over a cavity 1008 that is formed in a bulk substrate and allows for deformation of the cantilevered beam 1004, as shown in FIG. 10. An example of a method of fabricating this is described in more detail below. A GMR stack 1010 comprising the two ferromagnetic layers, the non-magnetic conducting spacer layer and the underlayer and capping layers are deposited on deformable beam 1004, and leads 1012 are connected thereto to send current I through it and to sense the resulting voltage. It should be apparent that the support structure for MR layer 1010 can be a variety of different structures other than the beam 1004 of this example, such as a sealed membrane over an enclosure, or any other form that may be suitable for detecting deflection and stress.

Under the application of a force on the beam 1004, it deflects. Note that in this configuration of the beam, the stress direction needs to be either unidirectional or if bidirectional, needs to be different along the two principal axes. If the length of the beam is "1", the width "b", and the thickness "t", for a load per unit length "W", the maximum compressive stress in the center of the top surface of the beam is $$\sigma_{max}=Mt/2I=(1/4)(W/b)(1^2/t^2) \qquad \text{(Equation 7)}$$

where M is the moment at the center of the beam and I is the moment of inertia about the vertical axis. The stress is tensile at the edges of the top surface of the beam, and the sensor can also be positioned at these locations, with the appropriate sign of magnetostriction.

The maximum stress and strain occur on the surface of the beam. Since the multi-layer stack 1010 is located on the surface of the beam 1004, and is a very thin set of films, for calculation and illustration purposes, one can assume that the GMR element is subjected to the maximum stress and strain.

Under these conditions, the multi-layer stack is subjected to the maximum compressive stress on the beam surface, as the beam bends in response to applied pressure. The magnetostriction of the device causes the resistance of the element to change depending on the sign of the applied stress, as described earlier. In this way, by measuring the resistance prior to and during the application of the stress, the difference in resistance gives a good indication of the magnitude of the stress. If the system is calibrated, this can give an idea of the absolute stress as well as just the presence of a pressure point.

In accordance with an aspect of the invention, the sensitivity of the device as described above exceeds the sensitivity of a capacitance based sensor or a piezoresistive sensor. As a result, considerable miniaturization can be realized with GMR sensor 1010. With conventional fabrication methods, the GMR element can be made as small as one to two microns long while maintaining considerable sensitivity (e.g., >1%). From equation 7, this sensitivity varies directly as the square of the length of the beam, and inversely as the square of the thickness. As a result, if the thickness is appropriately tailored for the length of the beam, good sensitivity can be obtained even for beam lengths of 1–2 microns and a thickness of 0.2 micron. It is desirable to make the beam as long as possible within the constraints of the product, because sensitivity only improves with the length of the beam. In contrast, a capacitance based sensor or piezoresistance based sensor would require a beam thickness of the order of a few nanometers for a beam length of 2 micron in order to get any valid signal for small values of applied pressure. This would make the beam very weak from a mechanical standpoint, and make it susceptible to fracture.

Preferably, in order to achieve the maximum sensitivity of the sensor to an applied stress, in addition to designing the beam for maximum deflection under a given load, it is appropriate to choose an alloy and deposition conditions that would ensure a maximum $_\Delta R/R$ response from the material, as well as a maximum magnetostriction coefficient.

Figure 11:
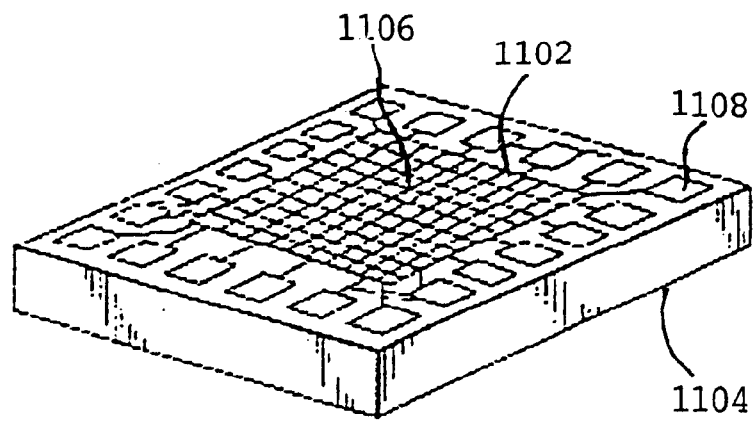
FIG. 11 illustrates a two dimensional array of beams or diaphragms employing giant magnetoresistive devices such as those illustrated in FIG. 8A or 8D or 8E for use as pressure sensors in accordance with the invention.

A magnetoresistive pressure sensor 1102 (that can be used for fingerprint verification/identification, for example) employing GMR sensors 1110 as described above will now be described in detail with reference to FIG. 11. Several sensors 1110 as described above are placed in an array 1106 of m rows by n columns on a substrate 1104, with a very fine pitch, and connected to electrodes 1108. Because the sensors can be made as small as 1–2 microns in length, the lateral resolution can be as good as 5 microns. For example, when a finger is placed on the array, the ridges on the fingers (which are spaced at about 400–500 microns, and are therefore considerably wider than the sensor pitch in the array), apply a force on the sensors that they come in contact with. The sensors that fall between the ridges experience little to no stress. In this way, one can generate a map of the contact points or the ridges on the fingerprint, and get an accurate reproduction of the fingerprint. However, in practice, the sensor length and pitch can be made greater than 5 microns, since such a good resolution is typically not required for a fingerprint image. Moreover, as the sensor pitch decreases, the processing time for the image increases, since the number of sensors in the image increases as well. The length of the multi-layer stack is typically in the range of 2–200 microns, and the width is in the range of 0.1–100 microns. For a fingerprint image capture application, the sensor dimensions are preferably 0.5–2 micron wide and 5–10 micron long.

Figure 12:
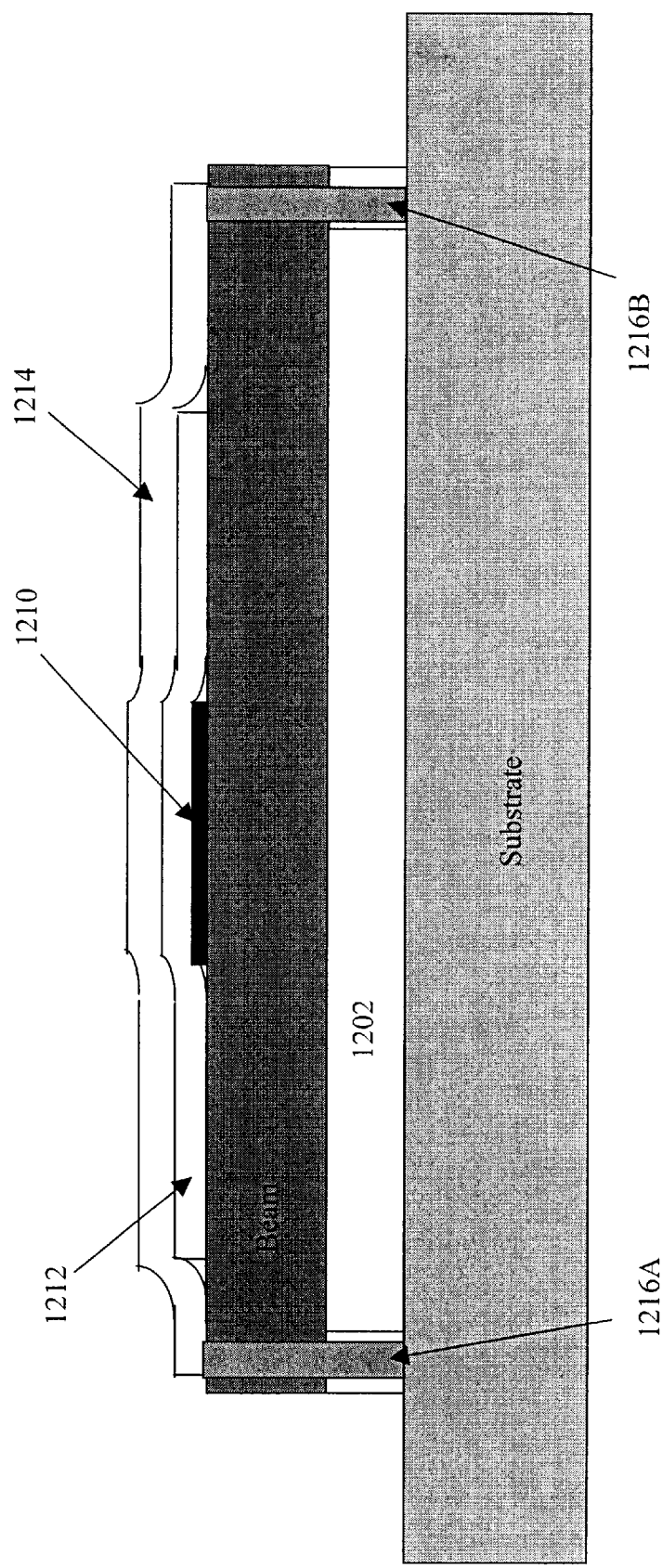
FIG. 12 illustrates the use of a conductive layer separated by an insulating spacer from the sensor on the beam, which conductive layer's function is to dissipate ESD charges to ground and protect the sensor from ESD damage.

In order to protect the GMR sensor during its use as a fingerprint sensor, different schemes may be used. For ESD protection, FIG. 12 shows a beam 1204 disposed over a cavity 1202, with GMR stack 1210 formed on the beam 1204. A layer of insulating material 1212 then coated on top of the GMR stack 1210, and then another layer 1214 of a conductive metal (such as Titanium, copper, etc.) is deposited, whose purpose is to bleed off transient charges caused by ESD. This conductive film 1214 needs to be grounded, so that the charges from the transient voltage spikes can be bled to ground. This is illustrated in FIG. 12, with grounding leads 1216A and 1216B shown from the conductive layer in order to dissipate ESD charges to ground that is within the substrate.

Secondly, to protect the GMR stack from mechanical abrasion or small impact, a hard coating can be deposited both above and below the conductive ESD protection layer. The thicknesses of all these layers would be in the range of 0.001 $\mu$m–5 $\mu$m. The material used for the mechanically protective coatings could be a material such as carbon based material, such as "diamond like carbon" or silicon carbide, for example. These materials can also be tailored to have surface energies such that undesired deposits, such as debris or oils from the finger, are prevented from adhering to the coating.

Figure 13:
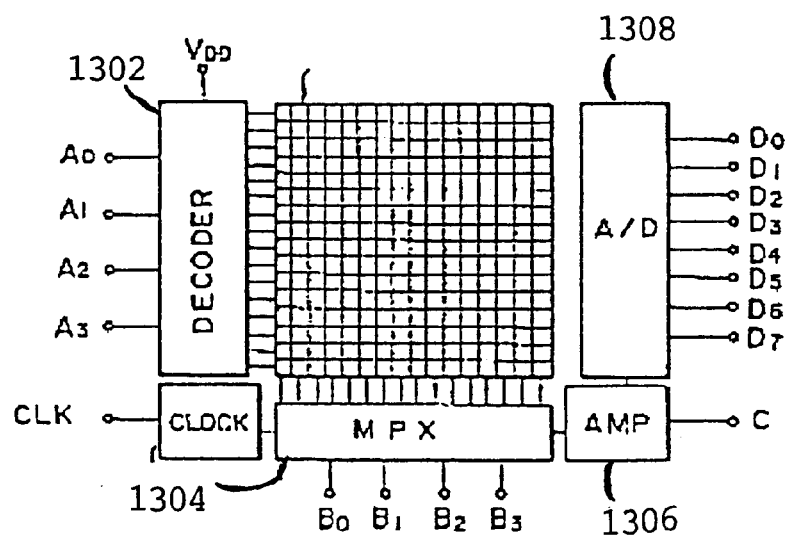
FIG. 13 illustrates an example of circuitry for performing electronic measurement in a two dimensional array of pressure sensors employing giant magnetoresistive sensor such as that illustrated in FIG. 11 in accordance with the invention.

An example of electronic circuitry and a method that can be used to probe an array of sensors either individually or in groups is shown in FIG. 13. It includes a decoder 1302, a multiplexer 1304, and amplifier 1306, and A/D converter 1308. The techniques for providing such electronic circuitry and method according to this example are well known and detailed descriptions thereof are not necessary for an understanding of the present invention.

In accordance with an aspect of a method of fingerprint identification/verification in accordance with the invention, however, to determine whether there is a stress on a particular sensor, a baseline is first established with no finger on the sensor, where the "quiescent" resistance of each element of the array is measured. Then the readings are repeated with the finger on the sensor, and the difference in voltages between the "quiescent, unstressed" state and the "stressed" state is calculated to determine the fingerprint pattern. The method of scanning, providing power to each element, conversion of the values from analog to digital, etc are well known. Note that the baseline can desirably be established either immediately prior to or immediately following the imaging of the fingerprint.

An advantage of the method of this invention is that it always establishes a reference value, which eliminates the effect of ambient temperature, humidity, stress, etc. The prior art, using capacitive or optical means are unable to obtain such a reference each time a measurement is taken, because they depend on the presence of a finger to obtain a reading each time. Even though the resistance of the sensor changes with temperature, this effect can be automatically compensated for by establishing a reference value, either immediately prior to or immediately following the fingerprint imaging, as noted above.

It should be apparent to those skilled in: the art that since the MR sensor's output depends on a number of factors, it can be used in a variety of alternative ways in this and other embodiments other than for fingerprint identification/verification.

Figure 14A:
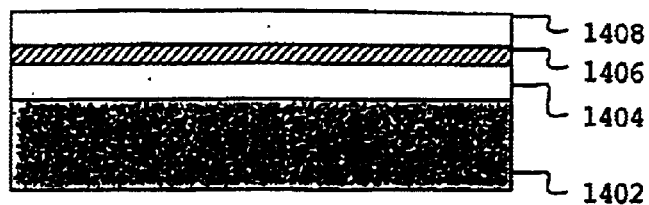
FIG. 14 illustrates a method for fabricating a beam or diaphragm which would employ a giant magnetoresistive device such as that illustrated in FIG. 8 for the purpose of pressure sensing in accordance with the invention.
Figure 14B:
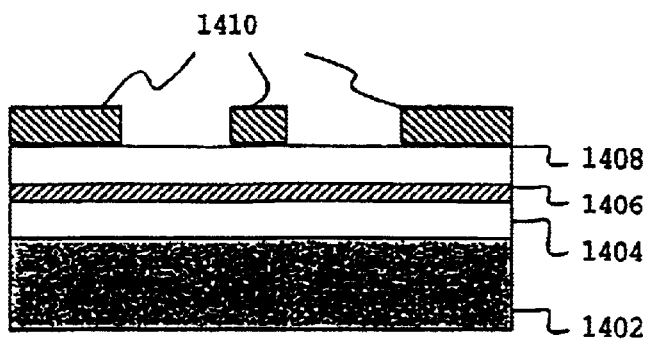
Figure 14C:
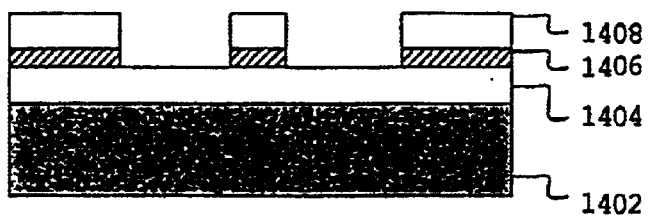
Figure 14D:
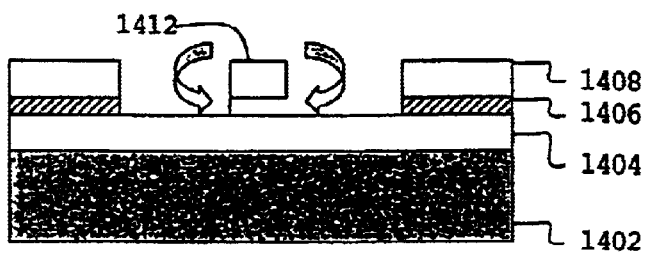

An example of a method for manufacturing a magnetoresistive sensor in accordance with the invention will now be described with reference to FIG. 14. As shown in FIG. 14A, a layer of silicon nitride 1404 is first deposited on a silicon substrate 1402, then a layer of polysilicon 1406, followed by another layer of silicon nitride 1408. Then the pattern of the beam is etched using photolithography by depositing a layer of photoresist 1410 as shown in FIG. 14B, and etching through at least the top two layers of silicon nitride and polysilicon as shown in FIG. 14C. This is followed by preferentially etching out the second layer of polysilicon underneath the silicon nitride in the beam portion 1412, thus forming a simply suspended beam 1412 of the upper layer of silicon nitride as shown in FIG. 14D.

Alternatively, using similar techniques as are known in the art, a thin silicon beam or membrane is made by starting from a silicon wafer using conventional processing means as have been described elsewhere in the literature. This is typically done either by etching from the back side using anisotropic etchants, or using single sided wafer processing, by first doping the wafer with n-type doping elements (arsenic), covering with a layer of epitaxial silicon, then etching using a chlorine gas plasma to preferentially etch the N+ region. The preferential etching of the N+ region under the top layer of epitaxial silicon leaves the upper layer suspended as a beam, supported on either side.

It should be noted that even though the manufacturing descriptions above are for the processing of silicon, one can use other materials to achieve the same purpose as well. For example, one could use a substrate of Aluminum, coat it with a layer of insulating alumina (using thin film deposition techniques that are well known), sputter another layer of metal (such as aluminum, titanium, copper, etc.). One can now perform photolithography and use dry etching techniques (such as ion milling) to etch down to the underlying layer of aluminum, and then use etchants that are selective to alumina to etch out the underlying alumina layer. In this way, a "bridge" structure of aluminum or other metal can be formed as well.

Figure 14E:
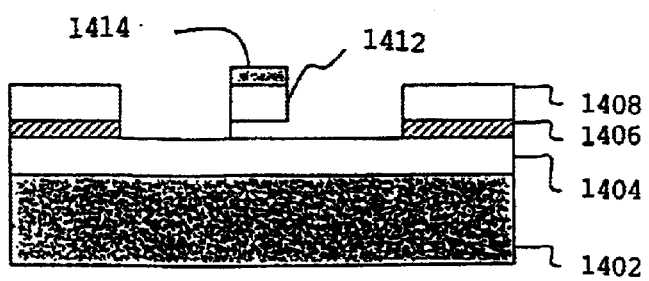

Once the beam is formed, a series of thin films is deposited using thin film techniques (typically a cluster tool), representing the magnetoresistive "stack". This series of materials comprises a Tantalum layer (the underlayer), a layer of Ni—Fe—Cr (which is the soft adjacent layer), another layer of Tantalum, followed by a thin film of Nickel Iron (the MR material). This stack of thin films is deposited on the entire substrate, and therefore will cover the beam, and the exposed portions of the recess under the beam. Only the portions of the stack on top of the beam are the operative portions, hence a photolithographic process is used to either wet etch or dry etch out the portions of the stack that cover the rest of the substrate other than the portion 1414 on the beam 1412, as shown in FIG. 14E. Typically, the beam can be made anywhere from 0.2 micron to 20 microns thick; the length of the beam can range from 2 micron to several hundred microns, and the width of the beam can range from 2 micron to several microns. These parameters depend on the mechanical properties of the substrate material used to create the beam, and on the sensitivity required. The beam can be designed to either have "standoff" from the substrate, or can be a free standing structure, with the bottom of the substrate completely etched out.

Although the present invention has been described in detail with reference to the preferred embodiments thereof, those skilled in the art will appreciate that various substitutions and modifications can be made to the examples described herein while remaining within the spirit and scope of the invention as defined in the appended claims.

We claim:

1. A method of sensing pressure in which applied pressure causes a change in magnetization vectors of ferromagnetic layers and a corresponding change in resistance comprising the steps of:

providing a sensing device with a sensor including a plurality of layers, the plurality of layers comprising a non magnetic conducting layer disposed between at least two ferromagnetic layers, at least one of the ferromagnetic layers having a non-zero magnetostriction;

biasing at least one of the two ferromagnetic layers with an externally supplied current such that the magnetization vectors of each ferromagnetic layer in a biased state are changed from an initial state; and sensing a resistance in the plurality of layers upon application of pressure while the externally supplied current is being applied, the applied pressure causing the magnetization vectors of at least one of the ferromagnetic layers to change from the biased state, and thereby result in a change in resistance.

2. A method according to claim 1 wherein the externally supplied current is applied parallel to a plane created by the plurality of layers.

3. A method according to claim 2 wherein the non magnetic conducting layer provides ferromagnetic coupling of the two ferromagnetic layers which affects the magnetization vectors of the two ferromagnetic layers in an initial state.

4. A method according to claim 3 wherein the sensing device includes a plurality of sensors that are formed in a two dimensional array and operate as the one sensor such that each sensor detects the pressure of an area associated with that sensor.

5. A method according to claim 2 wherein the sensing device includes a plurality of sensors that are formed in a two dimensional array and operate as the one sensor such that each sensor detects the pressure of an area associated with that sensor.

6. A method according to claim 2 further comprising the step of sensing a reference resistance of the sensing device when the ferromagnetic layers are in the biased state without the application of pressure.

7. A method according to claim 6, wherein the step of sensing the reference resistance is sensed either immediately prior to or immediately following the sensing of applied pressure.

8. A method according to claim 6, further comprising the step of determining the pressure applied to the sensing device, the step of determining using both the reference resistance and the sensed resistance in order to minimize the influence of external conditions on the determined pressure.

9. A method according to claim 8, wherein an external condition is a liquid film applied over the sensing device.

10. A method according to claim 8, wherein the sensing device includes a plurality of sensors that are each formed and operate as the one sensor such that each sensor detects the pressure of an area associated with that sensor.

11. A method according to claim 10, wherein the step of sensing senses the resistance that exists during the obtaining of a fingerprint and further includes the step of using the resistance sensed by each sensor to determine the fingerprint.

12. A method according to claim 2, wherein only compressive forces are sensed in the step of sensing.

13. A method according to claim 2, wherein compressive and tensile forces are sensed in the step of sensing.

14. A method according to claim 13, wherein the step of biasing biases the magnetization vectors so that substantially equal compressive and tensile forces can be sensed.

15. A method according to claim 2, wherein the step of biasing adjusts sensitivity and dynamic range of the sensing device by altering the externally supplied current.

16. A method according to claim 2, wherein both of the ferromagnetic layers have non-zero magnetostriction.

17. A method according to claim 16, wherein the non-zero magnetostriction of both of the ferromagnetic layers is substantially equal.

18. A method according to claim 2, wherein only one of the ferromagnetic layers has a non-zero magnetostriction to allow rotation of the one ferromagnetic layer under the application of stress, while the other ferromagnetic layer has one of a near zero magnetostriction or magnetostriction of a sign opposite to that of the one ferromagnetic layer, in order to allow sensing of stress of either sign.

19. A method according to claim 2, further including the step of supplying a current pulse to allow for automatic temperature compensation.

* * * * *